(12) United States Patent
Ding et al.

(10) Patent No.: US 9,365,450 B2
(45) Date of Patent: Jun. 14, 2016

(54) BASE-LAYER CONSISTING OF TWO MATERIALS LAYER WITH EXTREME HIGH/LOW INDEX IN LOW-E COATING TO IMPROVE THE NEUTRAL COLOR AND TRANSMITTANCE PERFORMANCE

(71) Applicants: Intermolecular Inc., San Jose, CA (US); Guardian Industries Corp., Auburn Hills, MI (US)

(72) Inventors: Guowen Ding, San Jose, CA (US); Brent Boyce, Novi, MI (US); Muhammad Imran, Brownstown, MI (US); Minh Huu Le, San Jose, CA (US); Zhi-Wen Sun, Sunnyvale, CA (US); Yu Wang, San Jose, CA (US); Yongli Xu, Plymouth, MI (US)

(73) Assignees: Intermolecular, Inc., San Jose, CA (US); Guardian Industries, Corp., Auburn Hills, MI (US)

( * ) Notice: Subject to any disclaimer, the term of this patent is extended or adjusted under 35 U.S.C. 154(b) by 35 days.

(21) Appl. No.: 13/728,042

(22) Filed: Dec. 27, 2012

(65) Prior Publication Data

US 2014/0186598 A1    Jul. 3, 2014

(51) Int. Cl.
*C03C 17/36* (2006.01)

(52) U.S. Cl.
CPC ............... *C03C 17/36* (2013.01); *C03C 17/366* (2013.01); *C03C 17/3644* (2013.01); *C03C 17/3681* (2013.01); *C03C 17/3618* (2013.01); *Y10T 428/24975* (2015.01)

(58) Field of Classification Search
CPC ............ C03C 17/3618; C03C 17/3681; C03C 17/366; C03C 17/3644
See application file for complete search history.

(56) References Cited

U.S. PATENT DOCUMENTS

| 3,601,471 | A | * | 8/1971 | Seddon | .................. C03C 17/36 |
| | | | | | 156/325 |
| 3,935,351 | A | | 1/1976 | Franz | |
| 3,990,784 | A | * | 11/1976 | Gelber | .................... C03C 17/36 |
| | | | | | 359/589 |
| 4,510,190 | A | * | 4/1985 | Glaser | .................... C03C 17/36 |
| | | | | | 204/192.22 |

(Continued)

FOREIGN PATENT DOCUMENTS

| CN | 201387491 Y | * | 1/2010 |
| DE | 102011076754 | * | 12/2012 |
| WO | WO-2010-005853 A1 | | 1/2010 |

OTHER PUBLICATIONS

Machine translation of CN 201387491 Y, obtained from Google Patents on Jul. 24, 2015.*

(Continued)

*Primary Examiner* — Aaron Austin
*Assistant Examiner* — Zheren J Yang

(57) ABSTRACT

Low emissivity coated panels can be fabricated using a base layer having a low refractive index layer on a high refractive index layer. The low refractive index layer can have refractive index less than 1.5, and can include $MgF_2$, $CaF_2$, $SiO_2$, or BO. The high refractive index layer can have refractive index greater than 2.3, and can include $TiO_x$, $NbO_x$, or $BiO_x$. The multilayer base structure can allow color tuning with enhanced transmission, for example, as compared to similar structures having single layer base layer.

8 Claims, 8 Drawing Sheets

(56) References Cited

U.S. PATENT DOCUMENTS

| | | | | |
|---|---|---|---|---|
| 4,710,433 A * | 12/1987 | Rowe | C03C 17/36 | 428/428 |
| 5,183,700 A * | 2/1993 | Austin | C03C 17/3435 | 359/359 |
| 5,523,132 A * | 6/1996 | Zhang | B32B 17/06 | 126/907 |
| 5,891,556 A * | 4/1999 | Anderson | B32B 17/10036 | 204/192.15 |
| 5,919,561 A * | 7/1999 | Fuchs | C23C 28/00 | 428/215 |
| 5,935,702 A | 8/1999 | Macquart | | |
| 5,965,246 A * | 10/1999 | Guiselin | C03C 17/3423 | 359/580 |
| 6,045,896 A | 4/2000 | Boire | | |
| 6,049,419 A * | 4/2000 | Wheatley | B32B 17/10018 | 359/359 |
| 6,235,398 B1 * | 5/2001 | Nakamura | G02B 5/204 | 359/359 |
| 6,238,781 B1 * | 5/2001 | Anderson | B32B 17/10036 | 359/580 |
| 6,387,515 B1 * | 5/2002 | Joret | B32B 17/10036 | 428/216 |
| 6,399,228 B1 * | 6/2002 | Simpson | B05D 5/065 | 359/360 |
| 6,432,545 B1 * | 8/2002 | Schicht | C03C 17/36 | 428/428 |
| 6,586,098 B1 * | 7/2003 | Coulter | C09C 1/0015 | 428/403 |
| 6,665,120 B2 * | 12/2003 | Hatakeyama | G02B 5/0858 | 359/581 |
| 6,777,085 B1 * | 8/2004 | Argoitia | C09C 1/0015 | 428/328 |
| 7,449,244 B2 * | 11/2008 | Vilato | F24B 1/192 | 126/500 |
| 7,708,823 B2 * | 5/2010 | Kniess et al. | | 106/403 |
| 7,740,946 B2 * | 6/2010 | Morimoto | H05K 9/0096 | 428/432 |
| 7,826,704 B2 | 11/2010 | Chen | | |
| 7,964,285 B2 | 6/2011 | Hartig | | |
| 8,304,072 B2 * | 11/2012 | Varaprasad | B32B 17/10036 | 204/192.1 |
| 8,329,304 B2 * | 12/2012 | Wang | H01J 11/10 | 428/432 |
| 8,445,098 B2 * | 5/2013 | Medwick | C03C 17/36 | 427/383.5 |
| 8,900,423 B2 * | 12/2014 | Ding | C23C 14/34 | 204/192.26 |
| 2002/0008924 A1 * | 1/2002 | Kurobe | C03C 17/36 | 359/883 |
| 2002/0102352 A1 * | 8/2002 | Hartig | C03C 17/36 | 427/165 |
| 2002/0192473 A1 * | 12/2002 | Gentilhomme | C03C 17/3435 | 428/432 |
| 2003/0017316 A1 * | 1/2003 | Pfaff | A61K 8/19 | 428/212 |
| 2003/0104220 A1 * | 6/2003 | Eby | C03C 17/366 | 428/426 |
| 2003/0224181 A1 * | 12/2003 | Finley | B32B 17/10036 | 428/432 |
| 2004/0137235 A1 * | 7/2004 | Paul | C03C 17/36 | 428/432 |
| 2005/0196623 A1 * | 9/2005 | McKown | C03C 17/3417 | 428/432 |
| 2006/0023131 A1 * | 2/2006 | Takano | G02B 1/113 | 349/12 |
| 2006/0154089 A1 * | 7/2006 | Jung | B32B 17/10036 | 428/432 |
| 2006/0275612 A1 * | 12/2006 | Baubet | B32B 17/10174 | 428/432 |
| 2007/0036986 A1 * | 2/2007 | Chonlamaitri | C03C 17/36 | 428/428 |
| 2007/0178316 A1 * | 8/2007 | Mellott | C03C 17/36 | 428/426 |
| 2007/0275252 A1 * | 11/2007 | Krasnov | | 428/432 |
| 2007/0281178 A1 * | 12/2007 | Oh | C03C 17/36 | 428/469 |
| 2008/0131693 A1 * | 6/2008 | Hiruma | G02B 5/0858 | 428/336 |
| 2008/0163929 A1 * | 7/2008 | Krasnov | C01G 9/00 | 136/265 |
| 2009/0104385 A1 * | 4/2009 | Reymond et al. | | 428/34 |
| 2009/0226735 A1 * | 9/2009 | Nadaud | C03C 17/002 | 428/446 |
| 2009/0296190 A1 | 12/2009 | Anderson | | |
| 2009/0297878 A1 * | 12/2009 | Chang | C03C 17/36 | 428/640 |
| 2010/0110553 A1 | 5/2010 | Anderson | | |
| 2010/0277786 A1 | 11/2010 | Anderson | | |
| 2011/0027554 A1 * | 2/2011 | Gouardes | C03C 17/36 | 428/213 |
| 2011/0051244 A1 * | 3/2011 | Huang | G02B 5/0858 | 359/584 |
| 2011/0064967 A1 * | 3/2011 | Stachowiak | C03C 17/36 | 428/623 |
| 2012/0012813 A1 * | 1/2012 | Chen | G02B 5/3041 | 257/72 |
| 2012/0024362 A1 * | 2/2012 | Gossman | H01L 31/02168 | 136/255 |
| 2013/0004678 A1 * | 1/2013 | Krasnov | H01L 31/1884 | 427/521 |
| 2014/0022630 A1 * | 1/2014 | Reymond | C03C 17/36 | 359/360 |
| 2014/0087100 A1 * | 3/2014 | Yaoita | C03C 17/36 | 428/34 |
| 2014/0104690 A1 * | 4/2014 | Sandre-Chardonnal | B32B 17/10 | 359/599 |
| 2014/0147654 A1 * | 5/2014 | Walther et al. | | 428/312.6 |
| 2014/0152943 A1 * | 6/2014 | Dorjgotov | H05B 33/22 | 349/96 |
| 2015/0232378 A1 * | 8/2015 | Hassan | C03C 17/366 | 427/165 |

OTHER PUBLICATIONS

Szczyrbowski, J., et al.; New low emissivity coating based on TwinMagw sputtered TiO2 and Si3N4 layers; Jan. 1, 1999; Z-Book—Elsevier; Thin Solid Films 351 1999 254259.

Kockert, K Dr.; Generation and control of colour appearance in architectural glass coating; Jan. 1, 2007; Von Ardenne Anlagentechnik GmbH; Glass Performance Days.

Grosse, P. et al.; Design of low emissivity systems based on a threelayer coating; Jan. 1, 1997; Z-Book—Elsevier B.V.; Journal of NonCrystalline Solids 218 1997 3843.

* cited by examiner

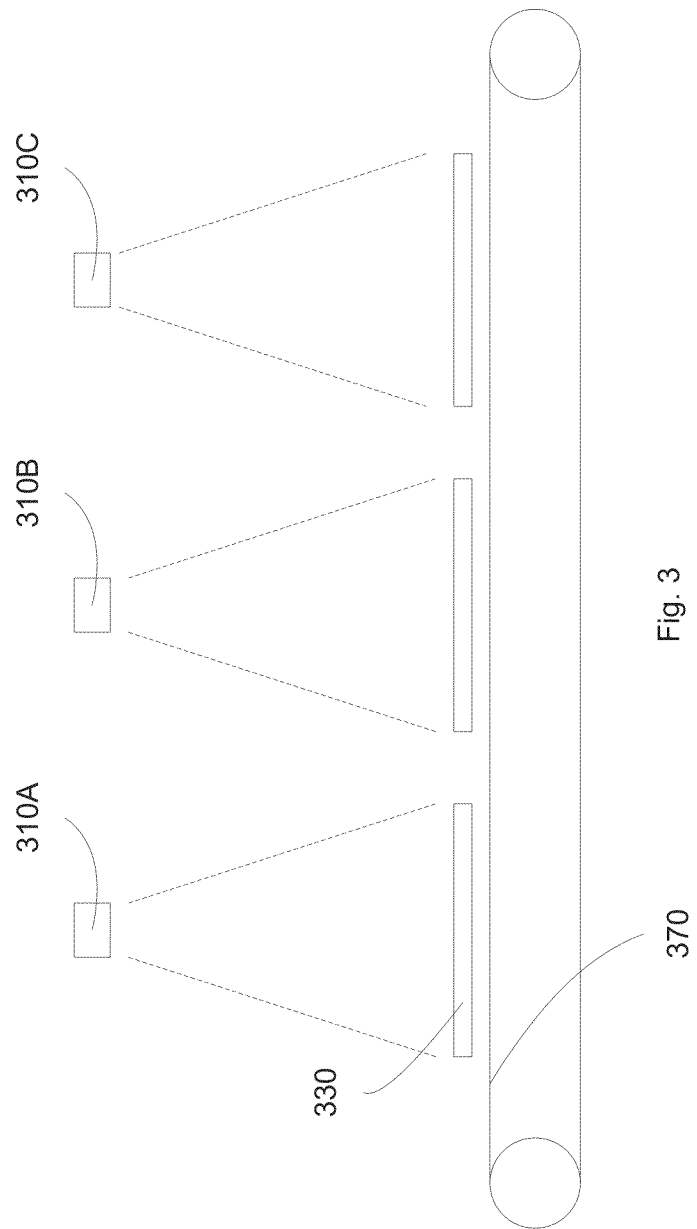

BASE-LAYER CONSISTING OF TWO
MATERIALS LAYER WITH EXTREME
HIGH/LOW INDEX IN LOW-E COATING TO
IMPROVE THE NEUTRAL COLOR AND
TRANSMITTANCE PERFORMANCE

FIELD OF THE INVENTION

The present invention relates generally to films providing high transmittance and low emissivity, and more particularly to such films deposited on transparent substrates.

BACKGROUND OF THE INVENTION

Sunlight control glasses are commonly used in applications such as building glass windows and vehicle windows, typically offering high visible transmission and low emissivity. High visible transmission can allow more sunlight to pass through the glass windows, thus being desirable in many window applications. Low emissivity can block infrared (IR) radiation to reduce undesirable interior heating.

In low emissivity glasses, IR radiation is mostly reflected with minimum absorption and emission, thus reducing the heat transferring to and from the low emissivity surface. Low emissivity, or low-e, panels are often formed by depositing a reflective layer (e.g., silver) onto a substrate, such as glass. The overall quality of the reflective layer, such as with respect to texturing and crystallographic orientation, is important for achieving the desired performance, such as high visible light transmission and low emissivity (i.e., high heat reflection). In order to provide adhesion, as well as protection, several other layers are typically formed both under and over the reflective layer. The various layers typically include dielectric layers, such as silicon nitride, tin oxide, and zinc oxide, to provide a barrier between the stack and both the substrate and the environment, as well as to act as optical fillers and function as anti-reflective coating layers to improve the optical characteristics of the panel.

The overall quality of the reflective layer, for example, its crystallographic orientation, is important for achieving the desired performance, such as high visible light transmission and low emissivity (i.e., high heat reflection). One known method to achieve low emissivity is to form a relatively thick silver layer. However, as the thickness of the silver layer increases, the visible light transmission of the reflective layer is reduced, as is manufacturing throughput, while overall manufacturing costs are increased. Therefore, is it desirable to form the silver layer as thin as possible, while still providing emissivity that is suitable for low-e applications.

SUMMARY

Important characteristics in low emissivity coating glass applications can include color neutrality and high visible light transmission. A typical low emissivity glass coating can include an infrared reflective layer, which can inhibit infrared frequencies and allowing visible light frequencies. Other layers can be included, such as an antireflective layer to reduce visible light reflectance, and a base layer to enhance the performance of the infrared reflective layer, such as acting as a seed layer to promote a crystal orientation, or as an adhesion layer for the infrared reflective layer to adhere to the glass substrate.

In some embodiments, base layer structures, and methods for forming the base layer structures, are provided to be used in low emissivity coatings. The base layer structures can include a layer of low refractive index disposed on a layer of high reflective index. The multilayer base structure can allow color tuning with enhanced transmission.

In some embodiments, the high refractive index layer can have a refractive index greater than 2.3, including a metal oxide such as $TiO_x$, $NbO_x$, or $BiO_x$. The thickness of the high refractive index layer can be between 10 and 15 nm. The low refractive index layer can have a refractive index less than 1.5, including $MgF_2$, $CaF_2$, or $SiO_2$, or a co-sputter oxide. The thickness of the low refractive index layer can be between 12 and 20 nm.

In some embodiments, the low refractive index layer can include BO material, which can have an index of refraction of 1.38. A coated panel including a base structure of 17 nm BO layer disposed on a 12 nm layer of $TiO_2$ can have a neutral color characteristic, together with a visible light transmission of greater than 85.5%.

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not necessarily to scale.

The techniques of the present invention can readily be understood by considering the following detailed description in conjunction with the accompanying drawings, in which:

FIG. 3 illustrates an in-line deposition system according to some embodiments.

DETAILED DESCRIPTION

Figure 1A:
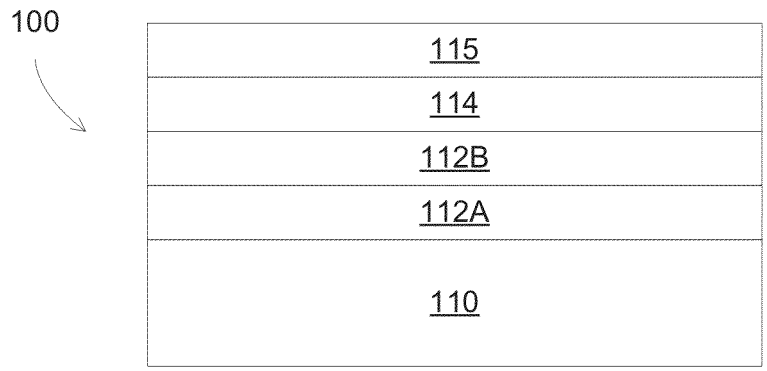
FIG. 1A illustrates a thin film coating according to some embodiments.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

In some embodiments, methods and apparatuses for making coated panels are disclosed. The coated panels can include coated layers, such as a low resistivity thin infrared reflective layer having a conductive material such as silver. The infrared reflective layer can include a conductive material, with the percentage of reflectance proportional to the conductivity. The conductivity of a material can depend on its crystallographic orientation, for example, (111) silver has lowest conductivity. To promote a desired crystallographic orientation of a deposited material, a seed layer can be used to provide a template. For example, to promote deposition of (111) silver layer, zinc oxide having (002) crystallographic orientation can be used as a seed layer. A layer below the seed layer, called a base layer, can also have influence on the silver quality, for example, due to the influence on the seed layer.

In some embodiments, provided are methods, and coated panels fabricated from the methods, for forming a low-e panel with improved overall quality of an infrared reflective layer (such as silver, gold or copper), together with improved neutral color and transmittance performance. The methods can include forming a base layer, including two material layers with different index of refraction.

In some embodiments, methods and apparatuses for making low emissivity coated panels, which include depositing a layer of low (or very low) refractive index disposed on a layer of high (or very high) reflective index. The multilayer base structure can allow color tuning with enhanced transmission.

In some embodiments, methods, and coated panels formed from the methods, are provided that can improve a zinc oxide containing seed layer, which in turn, can improve an infrared reflective layer, e.g., a silver layer. In some embodiments, methods are provided to form zinc oxide or doped zinc oxide layers having large grain sizes with preferred crystal orientation. For example, (002) oriented zinc oxide or doped zinc oxide layers can be formed on a layer of low refractive index disposed on a layer of high reflective index. The multilayer base structure can exhibit high visible light transmission, infrared reflection, together with color neutral characteristics.

In certain applications, color neutral can be a desirable property for coated articles. Color neutral can mean no clearly defined color. Color neutral can sometimes mean colors not found on the color wheel, such as beige, brown, gray, black and white. Generally speaking, the color property can be characterized as low values for a* and b* in CIELAB color system (e.g., |a*|<4, |b*|<4). In the CIELAB color system, L value indicates the lightness of the color, a* indicates the position between magenta and green (more negative values indicate stronger green and more positive values indicate stronger magenta), and b* indicates the position between yellow and blue (more negative values indicate stronger blue and more positive values indicate stronger yellow).

Many conventional methods of making the color of a coated article more neutral can result in decreased visible transmission and/or increased visible reflection. Heretofore, it has been difficult to increase visible transmission and reduce visible reflection, while at the same time providing or maintaining rather neutral color and satisfactory solar control or thermal characteristics.

In some embodiments, the two-layer base layer can provide both color neutral and high visible light transmittance, for example, by allowing color tuning with optimum selection of the individual layers in the two-layer base layer.

In some embodiments, the first layer of the two-layer base layer, e.g., the layer nearer the glass substrate, can have high refractive index. In some embodiments, the first layer can have refractive index greater than 2.3. The first layer can include $TiO_x$, $NbO_x$, or $BiO_x$.

In some embodiments, the second layer of the two-layer base layer, e.g., the layer on the first layer on the glass substrate, can have low refractive index, e.g., lower than that of the first layer. In some embodiments, the second layer can have refractive index smaller than 1.5. The second layer can include $MgF_2$, $CaF_2$, $SiO_2$, or co-sputter oxides. In some embodiments, the second layer can include boron oxide (BO), which has refractive index of 1.38, and is transparent in the visible wavelengths.

The coated transparent panels can include a glass substrate or any other transparent substrates, such as substrates made of organic polymers. The coated transparent panels can be used in window applications such as vehicle and building windows, skylights, or glass doors, either in monolithic glazings or multiple glazings with or without a plastic interlayer or a gas-filled sealed interspace.

FIG. 1A illustrates a thin film coating according to some embodiments. An infrared reflective layer, such as a silver layer 115, is disposed on a seed layer, such as a zinc oxide or a doped zinc oxide layer 114, which is disposed on a base layer 112A/112B on a substrate 110 to form a coated transparent panel 100, which has high visible light transmission, and low IR emission. The seed layer 114 can have (002) crystal orientation to promote a (111) crystal orientation of the silver layer 115. The base layer 112A/112B can include materials and/or crystal orientation to promote the (002) crystal orientation of the zinc oxide or doped zinc oxide layer 114. In some embodiments, the base layer can include a layer 112B having low refractive index on a layer 112A having high refractive index. The refractive index of the low refractive index layer can be less than 1.5. The refractive index of the high refractive index layer can be greater than 2.3. The high refractive index layer can include $TiO_x$, $NbO_x$, or $BiO_x$. The low refractive index layer can include $MgF_2$, $CaF_2$, $SiO_2$, or co-sputter oxides. In some embodiments, the low refractive index layer can include boron oxide.

The layers 112, 114, and/or 115 can be sputter deposited using different processes and equipment, for example, the targets can be sputtered under direct current (DC), pulsed DC, alternate current (AC), radio frequency (RF) or any other suitable conditions. In some embodiments, the present invention discloses a physical vapor deposition method for depositing the layers 112, 114, and/or 115. The deposition process can comprise a gas mixture introduced to a plasma ambient to sputter material from one or more targets disposed in the processing chamber. The sputtering process can further comprise other components such as magnets for confining the plasma, and utilize different process conditions such as DC, AC, RF, or pulse sputtering.

In some embodiments, a coating stack can be provided, including multiple layers for different functional purposes. For example, the coating stack can include a seed layer to facilitate the deposition of the reflective layer, and a base layer to facilitate the deposition of the seed layer. Other layers can be added, such as an oxygen diffusion barrier layer disposed on the reflective layer to prevent oxidation of the reflective layer, a protective layer disposed on the substrate to prevent physical or chemical abrasion, or an antireflective layer to reduce visible light reflection. The coating stack can include multiple layers of reflective layers to improve IR emissivity.

Figure 1B:
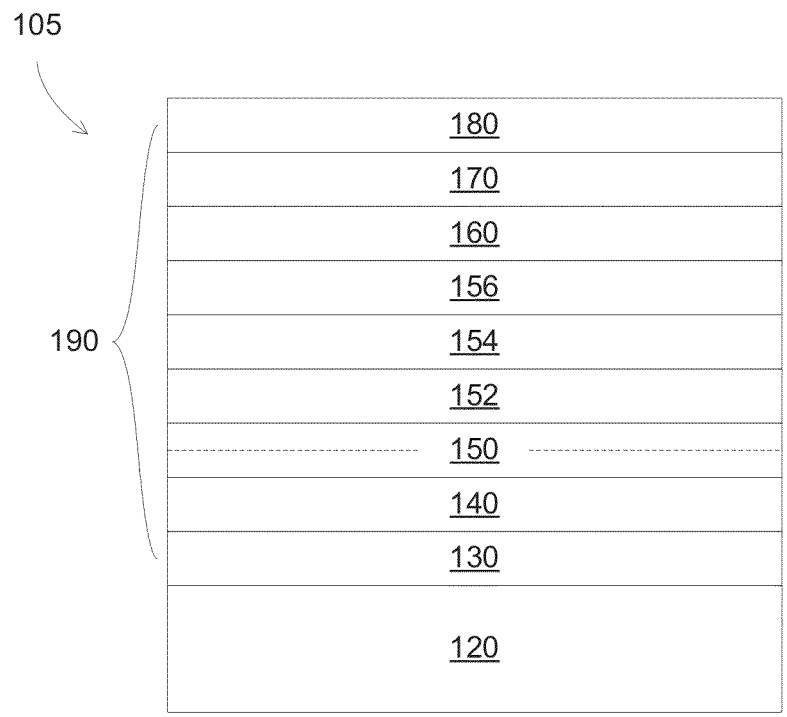
FIG. 1B illustrates a low emissivity transparent panel according to some embodiments.

FIG. 1B illustrates a low emissivity transparent panel 105 according to some embodiments. The low emissivity transparent panel can include a glass substrate 120 and a low-e stack 190 formed over the glass substrate 120. The glass substrate 120 in some embodiments can be made of a glass, such as borosilicate glass, and has a thickness of, for example, between 1 and 10 millimeters (mm). The substrate 120 may be square or rectangular and about 0.5-2 meters (m) across. In some embodiments, the substrate 120 may be made of, for example, plastic or polycarbonate.

The low-e stack 190 includes a lower protective layer 130, a lower oxide layer 140, a base layer 150, a seed layer 152, a reflective layer 154, a barrier layer 156, an upper oxide 160, an optical filler layer 170, and an upper protective layer 180. Some layers can be optional, and other layers can be added, such as interface layer or adhesion layer. Exemplary details as to the functionality provided by each of the layers 130-180 are provided below.

The various layers in the low-e stack 190 may be formed sequentially (i.e., from bottom to top) on the glass substrate 120 using a physical vapor deposition (PVD) and/or reactive (or plasma enhanced) sputtering processing tool. In some embodiments, the low-e stack 190 is formed over the entire glass substrate 120. However, in other embodiments, the low-e stack 190 may only be formed on isolated portions of the glass substrate 120.

The lower protective layer 130 is formed on the upper surface of the glass substrate 120. The lower protective layer 130 can include silicon nitride, silicon oxynitride, or other nitride material such as SiZrN, for example, to protect the other layers in the stack 190 from diffusion from the substrate 120 or to improve the haze reduction properties. In some embodiments, the lower protective layer 130 is made of silicon nitride and has a thickness of, for example, between about 10 nm to 50 nm, such as 25 nm.

The lower oxide layer 140 is formed on the lower protective layer 130 and over the glass substrate 120. The lower oxide layer 140 can be a metal oxide or metal alloy oxide layer and can serve as an antireflective layer.

The seed layer 152 can act as template layer for the IR reflective film, for example, a zinc oxide layer deposited before the deposition of a silver reflective layer can provide a silver layer with a preferred crystallographic orientation, which can lead to lower resistivity, improving its reflective characteristics. The seed layer can include zinc oxide or doped zinc oxide. In some embodiments, the seed layer can include other crystalline metal oxide such as $SnO_2$, $Sc_2O_3$, $Y_2O_3$, $TiO_2$, $ZrO_2$, $HfO_2$, $V_2O_5$, $Nb_2O_5$, $Ta_2O_5$, $CrO_3$, $WO_3$, or $MoO_3$.

In some embodiments, the seed layer 152 can be continuous and covers the entire substrate. For example, the thickness of the seed layer can be less than about 100 Angstroms, and preferably less than about 50 Angstroms. Alternatively, the seed layer 152 may not be formed in a completely continuous manner. The seed layer can be distributed across the substrate surface such that each of the seed layer areas is laterally spaced apart from the other seed layer areas across the substrate surface and do not completely cover the substrate surface. For example, the thickness of the seed layer 152 can be a monolayer or less, such as between 2.0 and 4.0 Å, and the separation between the layer sections may be the result of forming such a thin seed layer (i.e., such a thin layer may not form a continuous layer).

The reflective layer 154 is formed on the seed layer 152. The IR reflective layer can be a metallic, reflective film, such as gold, copper, or silver. In general, the IR reflective film includes a good electrical conductor, blocking the passage of thermal energy. In some embodiments, the reflective layer 154 is made of silver and has a thickness of, for example, 100 Å. Because the reflective layer 154 is formed on the seed layer 152, for example, due to the (002) crystallographic orientation of the seed layer 152, growth of the silver reflective layer 154 in a (111) crystalline orientation is promoted, which offers low sheet resistance, leading to low panel emissivity.

Because of the promoted (111) texturing orientation of the reflective layer 154 caused by the seed layer 152, the conductivity and emissivity of the reflective layer 154 is improved. As a result, a thinner reflective layer 154 may be formed that still provides sufficient reflective properties and visible light transmission. Additionally, the reduced thickness of the reflective layer 154 allows for less material to be used in each panel that is manufactured, thus improving manufacturing throughput and efficiency, increasing the usable life of the target (e.g., silver) used to form the reflective layer 154, and reducing overall manufacturing costs.

In some embodiments, the crystallographic orientation can be characterized by X-ray diffraction (XRD) technique, which is based on observing the scattered intensity of an X-ray beam hitting the layer, e.g., silver layer or seed layer, as a function of the X-ray characteristics, such as the incident and scattered angles. For example, zinc oxide seed layer can show a pronounced (002) peak and higher orders in a θ-2θ diffraction pattern. This suggests that zinc oxide crystallites with the respective planes oriented parallel to the substrate surface are present.

In some embodiments, the terms "silver layer having (111) crystallographic orientation", or "zinc oxide seed layer having (002) crystallographic orientation" include a meaning that there is a (111) preferred crystallographic orientation for the silver layer or a (002) preferred crystallographic orientation for the zinc oxide seed layer, respectively. The preferred crystallographic orientation can be determined, for example, by observing pronounced crystallography peaks in an XRD characterization.

In some embodiments, a base layer 150 is provided, which can serve as a seed layer for the ZnO seed layer 152. The base layer 150 can improve the ZnO film crystallinity and the preferred crystal orientation for the (002) basal plane to optimize the optical and electrical properties of the second ZnO seed layer 152. The base layer 150 can further improve the color property of the low-e stack, such as making the low-e stack color neutral.

In some embodiments, the base layer can include a layer of low refractive index on a layer of high refractive index. The thicknesses of the low refractive index layer and the high refractive index layer can be optimized to achieve a color neutral property, together with a high transmittance for the coated layers.

Because of the promoted (111) crystal orientation of the reflective layer 154, which is caused by the promoted (002) crystal orientation of the seed layer 152, which, in turn, is caused by the base layer 150, the conductivity and emissivity of the reflective layer 154 is improved. As a result, a thinner reflective layer 154 may be formed that still provides sufficient reflective properties and visible light transmission. Additionally, the reduced thickness of the reflective layer 154 allows for less material to be used in each panel that is manufactured, thus improving manufacturing throughput and efficiency, increasing the usable life of the target (e.g., silver) used to form the reflective layer 154, and reducing overall manufacturing costs.

Further, the seed layer 152 or the base layer 150 can provide a barrier between the metal oxide layer 140 and the reflective layer 154 to reduce the likelihood of any reaction of the material of the reflective layer 154 and the oxygen in the lower metal oxide layer 140, especially during subsequent heating processes. As a result, the resistivity of the reflective layer 154 may be reduced, thus increasing performance of the reflective layer 154 by lowering the emissivity.

Formed on the reflective layer 154 is a barrier layer 156, which can protect the reflective layer 154 from being oxidized. For example, the barrier layer can be a diffusion barrier, stopping oxygen from diffusing into the silver layer from the upper oxide layer 160. The barrier layer 156 can include titanium, nickel, chromium, or a combination of nickel, titanium, and chromium, such as NiCr or NiTi.

Formed on the barrier layer 156 is an upper oxide layer 160, which can function as an antireflective film stack, including a single layer or multiple layers for different functional purposes. The antireflective layer 160 serves to reduce the reflection of visible light, selected based on transmittance, index of refraction, adherence, chemical durability, and thermal stability. In some embodiments, the antireflective layer 160 includes tin oxide, offering high thermal stability properties. The antireflective layer 160 can include titanium dioxide, silicon nitride, silicon dioxide, silicon oxynitride, niobium oxide, SiZrN, tin oxide, zinc oxide, or any other suitable dielectric material.

Formed on the antireflective layer 160 is an optical filler layer 170. The optical filler layer 170 can be used to provide a proper thickness to the low-e stack, for example, to provide an antireflective property. The optical filler layer preferably has high visible light transmittance. In some embodiments, the optical filler layer 170 is made of tin oxide and has a thickness of, for example, 100 Å. The optical filler layer may be used to tune the optical properties of the low-e panel 105. For example, the thickness and refractive index of the optical filler layer may be used to increase the layer thickness to a multiple of the incoming light wavelengths, effectively reducing the light reflectance and improving the light transmittance.

Formed on the optical filler layer 170 is an upper protective layer 180. An upper protective layer 180 can be used for protecting the total film stack, for example, to protect the panel from physical or chemical abrasion. The upper protective layer 180 can be an exterior protective layer, such as silicon nitride, silicon oxynitride, titanium oxide, tin oxide, zinc oxide, niobium oxide, or SiZrN.

In some embodiments, adhesion layers can be used to provide adhesion between layers. The adhesion layers can be made of a metal alloy, such as nickel-titanium, and have a thickness of, for example, 30 Å.

Depending on the materials used, some of the layers of the low-e stack 190 may have some elements in common. An example of such a stack may use a zinc-based material in the oxide dielectric layers 140 and 160. As a result, a relatively low number of different targets can be used for the formation of the low-e stack 190.

In some embodiments, the coating can include a double or triple layer stack, having multiple IR reflective layers. In some embodiments, the layers can be formed using a plasma enhanced, or reactive sputtering, in which a carrier gas (e.g., argon) is used to eject ions from a target, which then pass through a mixture of the carrier gas and a reactive gas (e.g., oxygen), or plasma, before being deposited.

In some embodiments, sputter deposition processes, which can be applied for a base layer deposited before a conductive layer are provided. For example, the base layer can improve the smoothness of the infrared reflective layer. In some embodiments, the base layer can be sputtered from an alloyed target, or co-sputtered from different elemental targets onto the same substrate. The process may be in pure Ar, or may include oxygen to make the film oxidized.

Figure 2A:
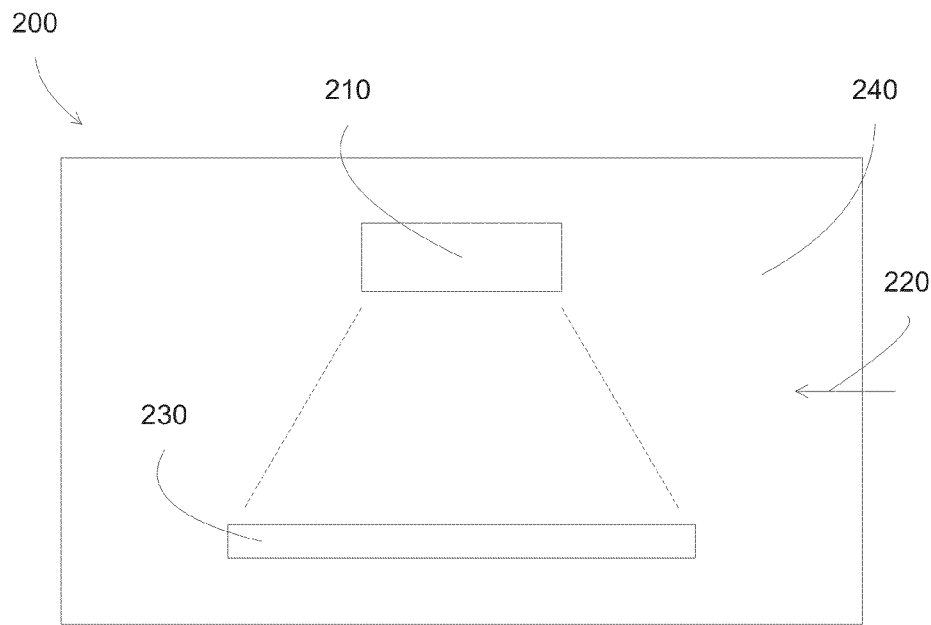
FIGS. 2A-2B illustrate physical vapor deposition (PVD) systems according to some embodiments.
Figure 2B:
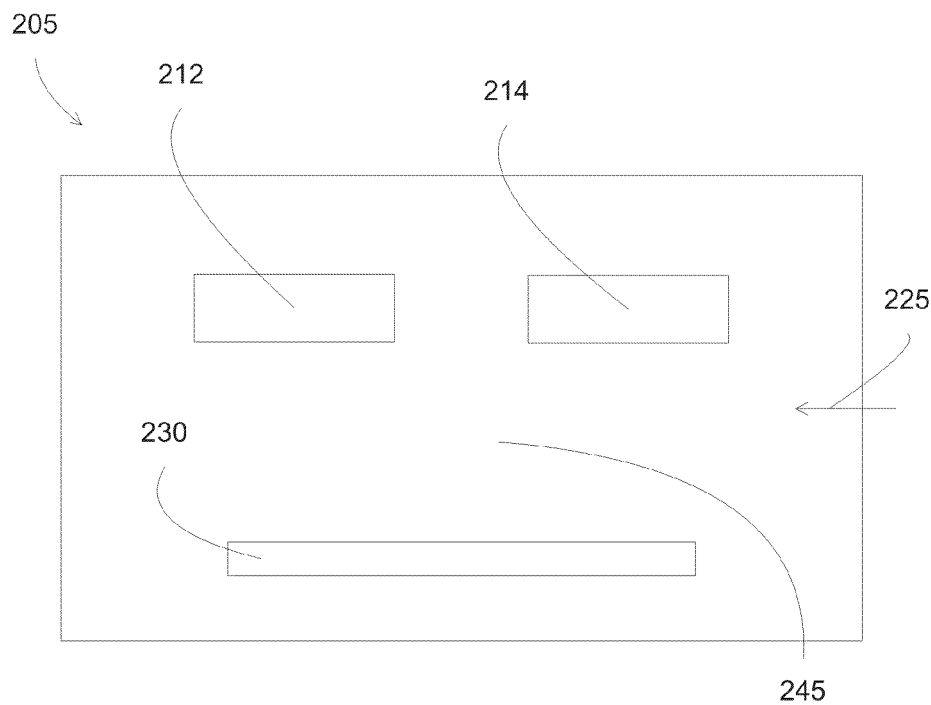

FIGS. 2A-2B illustrate physical vapor deposition (PVD) systems according to some embodiments. In FIG. 2A, a PVD system, also commonly called sputter system or sputter deposition system, 200 includes a housing that defines, or encloses, a processing chamber 240, a substrate 230, a target assembly 210, and reactive species delivered from an outside source 220. The substrate can be stationary, or in some manufacturing environments, the substrate may be in motion during the deposition processes. During deposition, the target is bombarded with argon ions, which releases sputtered particles toward the substrate 230. The sputter system 200 can perform blanket deposition on the substrate 230, forming a deposited layer that cover the whole substrate, e.g., the area of the substrate that can be reached by the sputtered particles generated from the target assembly 210.

In FIG. 2B, a sputter deposition chamber 205 includes two target assemblies 210A and 210B disposed in the processing chamber 240, containing reactive species delivered from an outside source 220. The target assemblies 210A and 210B can include the dopant and silver to deposit a doped silver layer on substrate 230. This configuration is exemplary, and other sputter system configurations can be used, such as a single target as above, including and alloy of dopant and silver.

The materials used in the target assembly 210 (FIG. 2A) may, for example, include Ag, Ti, Si, Pd, Cr, Ni, Zr, Mn, Fe, Ta, Pt, Zn, Sn, Mg, Al, La, Y, Sb, Sr, Bi, Al, Ga, In, Ca, V, Nb, Hf, B, or any combination thereof (i.e., a single target may be made of an alloy of several metals). Additionally, the materials used in the targets may include oxygen, nitrogen, or a combination of oxygen and nitrogen in order to form the oxides, nitrides, and oxynitrides described above. Additionally, although only one target assembly 210 is shown (FIG. 2A), additional target assemblies may be used (e.g. FIG. 2B). As such, different combinations of targets may be used to form, for example, the dielectric layers described above. For example, in some embodiments in which the dielectric material is zinc-tin-titanium oxide, the zinc, the tin, and the titanium may be provided by separate zinc, tin, and titanium targets, or they may be provided by a single zinc-tin-titanium alloy target. For example, the target assembly 210 can include a silver target, and together with argon ions, sputter deposit a silver layer on substrate 230. The target assembly 210 can include a metal or metal alloy target, such as Ag, Ti, or Ti—Ag alloy, to sputter deposit silver or doped silver layers.

The sputter deposition system 200 can include other components, such as a substrate support for supporting the substrate. The substrate support can include a vacuum chuck, electrostatic chuck, or other known mechanisms. The substrate support can be capable of rotating around an axis thereof that is perpendicular to the surface of the substrate. In addition, the substrate support may move in a vertical direction or in a planar direction. It should be appreciated that the rotation and movement in the vertical direction or planar direction may be achieved through known drive mechanisms which include magnetic drives, linear drives, worm screws, lead screws, a differentially pumped rotary feed through drive, etc.

In some embodiments, the substrate support includes an electrode which is connected to a power supply, for example, to provide a RF or dc bias to the substrate, or to provide a plasma environment in the process housing 240. The target assembly 210 can include an electrode which is connected to a power supply to generate a plasma in the process housing. The target assembly 210 is preferably oriented towards the substrate 230.

The sputter deposition system 200 can also include a power supply coupled to the target electrode. The power supply provides power to the electrodes, causing material to be, at least in some embodiments, sputtered from the target. During sputtering, inert gases, such as argon or krypton, may be introduced into the processing chamber 240 through the gas inlet 220. In embodiments in which reactive sputtering is used, reactive gases may also be introduced, such as oxygen and/or nitrogen, which interact with particles ejected from the targets to form oxides, nitrides, and/or oxynitrides on the substrate.

The sputter deposition system 200 can also include a control system (not shown) having, for example, a processor and a memory, which is in operable communication with the other components and configured to control the operation thereof in order to perform the methods described herein.

In some embodiments, the present invention discloses methods to form low-e panels, including forming a base layer for a seed layer, wherein the seed layer can be used as a seed layer for an infrared reflective layer. In some embodiments, a transparent substrate is provided. A base layer is formed over the transparent substrate. The base layer includes a low refractive index layer on a high refractive index layer. A seed layer is formed over the base layer. The seed layer includes zinc oxide or doped zinc oxide material. The seed layer preferably includes (002) crystal orientation. For example, more than about 30% of the seed layer has a (002) crystallographic orientation. A silver layer is formed on the seed layer. The silver layer preferably includes (111) crystal orientation.

In some embodiments, the base layer can improve the crystallinity and (002) orientation of the zinc oxide or doped zinc oxide layer. The improvement of the zinc oxide or doped zinc oxide layer can in turn improve the (111) silver growing on top of the zinc oxide or doped zinc oxide layer, producing a silver layer with improved electrical conductivity. The methods thus can maximize volume production, throughput, and efficiency of the manufacturing process used to form low emissivity panels.

In some embodiments, the seed layer can also include a pure metal layer, such as Ti, Zr, Hf, Y, La, Zn, Co, Ru, Cr, Mo, W, V, Nb, Ta, and rare earth metals. In some embodiments, the seed layer includes mixtures or compounds of metallic elements, such as metal alloys, metal nitrides, or metal oxynitride.

In some embodiments, the present invention discloses an in-situ formation of a zinc oxide layer on a base layer without exposure to atmosphere. By controlling the surface of the base layer, for example, to reduce any possible surface contamination, the crystallization of zinc oxide layer can be further promoted and not impeded by any adhered particulates.

In some embodiments, the present base layer can provide improved zinc oxide layer with thinner film thickness. The crystallization of zinc oxide layer, and consequently its electrical conductivity, is not a function of film thickness, and thus can offer similar film quality at different thicknesses. The thickness of zinc oxide layer can be less 100 nm, such as less than 50 nm. The base layer can also be thin, preferably less than 50 nm.

In some embodiments, the present invention discloses methods to form base layer and zinc oxide layer, including thin film deposition methods such as physical vapor deposition (PVD), chemical vapor deposition (CVD), atomic layer deposition (ALD), or wet chemical deposition methods such as electroplating or electroless deposition.

In some embodiments, sputter systems, and methods to operate the sputter systems, are provided for making coated panels having a base layer serving as a template for a ZnO seed layer, which then serves as a template for a silver layer. In some embodiments, an in-line deposition system, including a transport mechanism for moving substrates between deposition stations is provided.

In some embodiments, methods for making low emissivity panels in large area coaters are disclosed. A transport mechanism can be provided to move a substrate under one or more sputter targets, to deposit a base layer before depositing a seed layer, an antireflective layer, together with other layers such as a surface protection layer.

FIG. 3 illustrates an in-line deposition system according to some embodiments. A transport mechanism 370, such as a conveyor belt or a plurality of rollers, can transfer substrate 330 between different sputter deposition stations. For example, the substrate can be positioned at station #1, including a target assembly 310A, then transferred to station #2, including target assembly 310B, and then transferred to station #3, including target assembly 310C. Station #1 can be configured to deposit a first layer of the base layer, for example, including a high refractive index layer of $TiO_x$, $NbO_x$, and $BiO_x$. Station #2 can be configured to deposit a second layer of the base layer, for example, including a low refractive index layer of $MgF_2$, $CaF_2$, or $SiO_2$. In some embodiments, the low refractive index layer can include boron oxide. Station #3 can be configured to deposit a zinc oxide or a doped zinc oxide layer, which can include (002) crystal orientation. Station #3 can also be configured to deposit other seed layer materials, such as $SnO_2$, $Sc_2O_3$, $Y_2O_3$, $TiO_2$, $ZrO_2$, $HfO_2$, $V_2O_5$, $Nb_2O_5$, $Ta_2O_5$, $CrO_3$, $WO_3$, or $MoO_3$. Other stations can be included, such as a station to deposit a silver layer, which can include (111) crystal orientation. Other configurations can be included, for example, station #2 can include multiple target assemblies for co-sputtering. In addition, other stations can be included, such as input and output stations, or anneal stations.

After depositing a first layer in station #1, for example, a high refractive index of the base layer, the substrate is moved to station #2, where a low refractive index of the base layer can be deposited. The substrate is then transferred to station #3 to deposit a seed layer, such as zinc oxide (or doped zinc oxide or other seed layer materials). The substrate is then transferred to another station, for example, to deposit a silver layer over the zinc oxide layer.

The double layer base layer of low/high index of refraction, such as higher than 2.3 and lower than 1.5 refractive index, and in particular, using boron oxide as the low refractive index layer, can show improved performance as compared to a single layer base layer, for example, having color neutral property, together with higher visible light transmittance in the visible range.

Figure 4A:
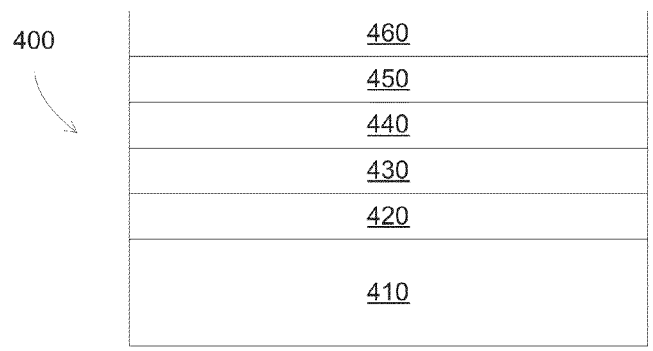
FIGS. 4A-4B illustrate a single layer base layer low emissivity stack according to some embodiments.
Figure 4B:
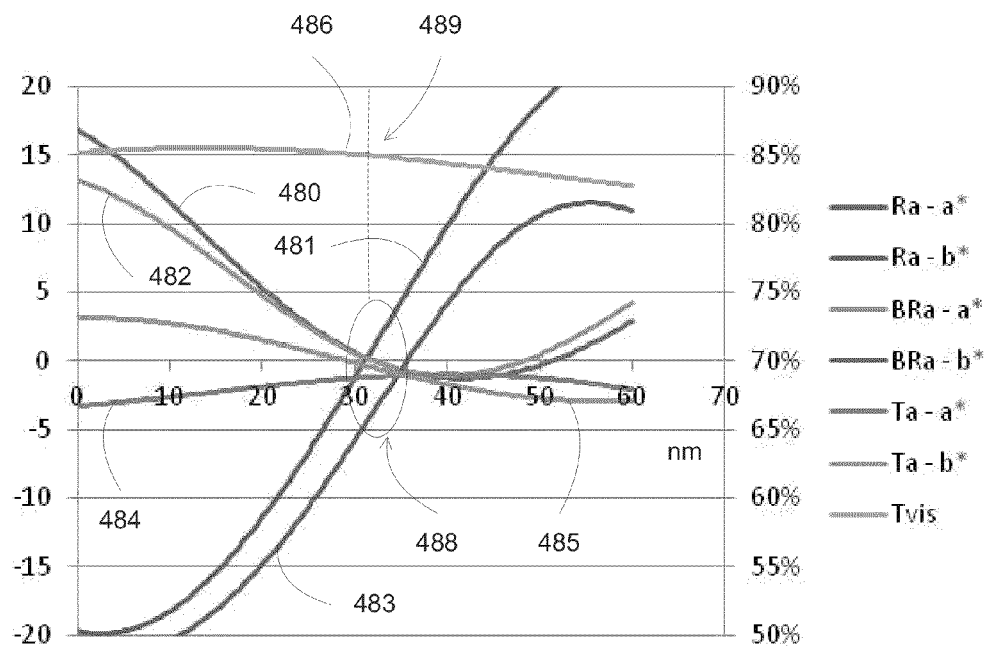

As a reference, a low emissivity stack including a single layer base layer is fabricated to measure the color and transmittance properties. FIGS. 4A-4B illustrate a single layer base layer low emissivity stack according to some embodiments. In FIG. 4A, a low emissivity stack including single layer base layer is shown. The low emissivity stack includes a single base layer of AlSnO formed on a glass substrate. A 10 nm ZnO seed layer is then formed on the AlSnO base layer. An 8 nm Ag infrared reflective layer is then formed on the ZnO layer. A 3 nm $TiO_x$ barrier layer is form on the silver layer. A 29 nm ZnO protective layer is formed on the $TiO_x$ layer.

FIG. 4B shows the color and transmittance properties of the single layer base layer low emissivity stack as a function of the base layer thickness (nm). The color property of the stack is measured using the a* and b* values (defined by the CIELAB technique) of the transmittance Ta, e.g., Ta-a* 484 and Ta-b* 485, of the reflection from the coated layer side Ra, e.g., Ra-a* 480 and Ra-b* 481, and of the reflection from the glass side BRa, e.g., BRa-a* 482 and BRa-b* 483. In addition, the transmittance of the visible light Tvis 486 is measured. For neutral color, optimum base layer thicknesses can include the thicknesses having low values of a* and b* values color property, e.g., negative or positive values near zero, such as less than about 3. The range 488 of optimum base layer thicknesses can be between 30 and 35 nm. To achieve color neutral, the thickness of the single layer base layer can be within this range. However, the optimum transmittance 489 of the coated stack, using a base layer showing neutral color, can be about 84.7%, determined from the transmittance curve 486 at the base layer thickness of about 32 nm.

Figure 5:
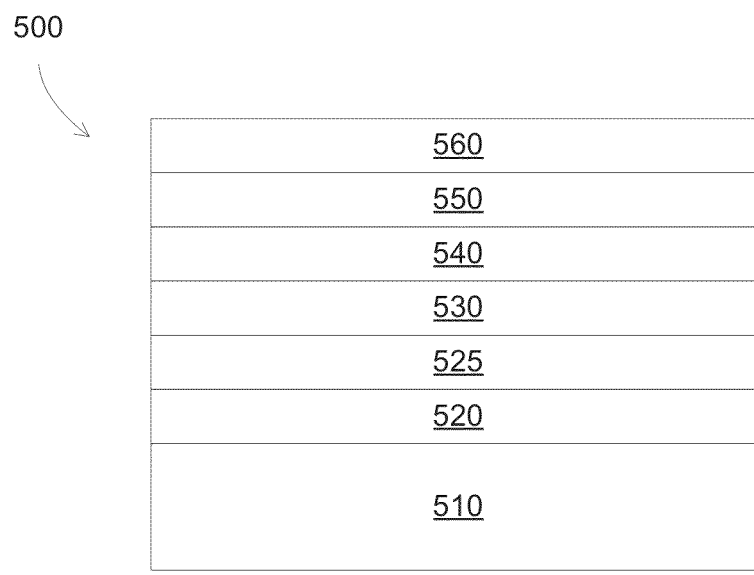
FIG. 5 illustrates a double layer base layer low emissivity stack according to some embodiments.

A low emissivity stack including a double layer base layer is also fabricated with similar coatings, except for the base layer, to measure the color and transmittance properties. FIG. 5 illustrates a double layer base layer low emissivity stack according to some embodiments. The low emissivity stack includes a double layer base layer of 17 nm BO on 12 nm $TiO_2$ formed on a glass substrate. Other layers are then formed on the double layer base layer, similar to the single layer base layer low emissivity stack. For example, a 10 nm ZnO seed layer is then formed on the $BO/TiO_2$ base layer. An 8 nm Ag infrared reflective layer is then formed on the ZnO layer. A 3 nm $TiO_x$ barrier layer is form on the silver layer. A 29 nm ZnO protective layer is formed on the $TiO_x$ layer.

Figure 6A:
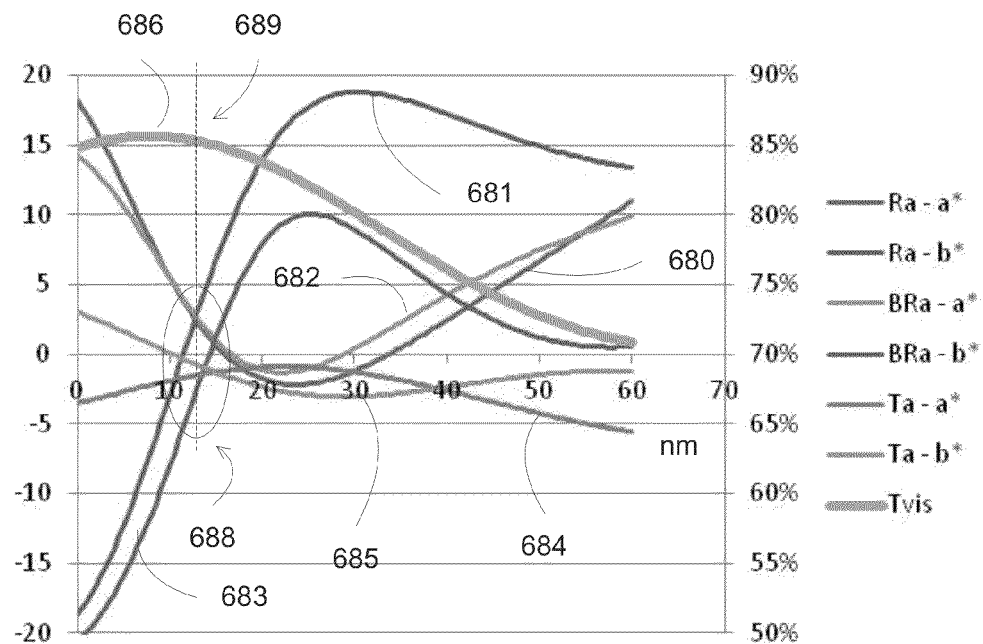
FIGS. 6A-6B illustrate the color and transmittance properties of the double layer base layer low emissivity stack as a function of the thicknesses (in nm) of individual layers in the base layer.
Figure 6B:
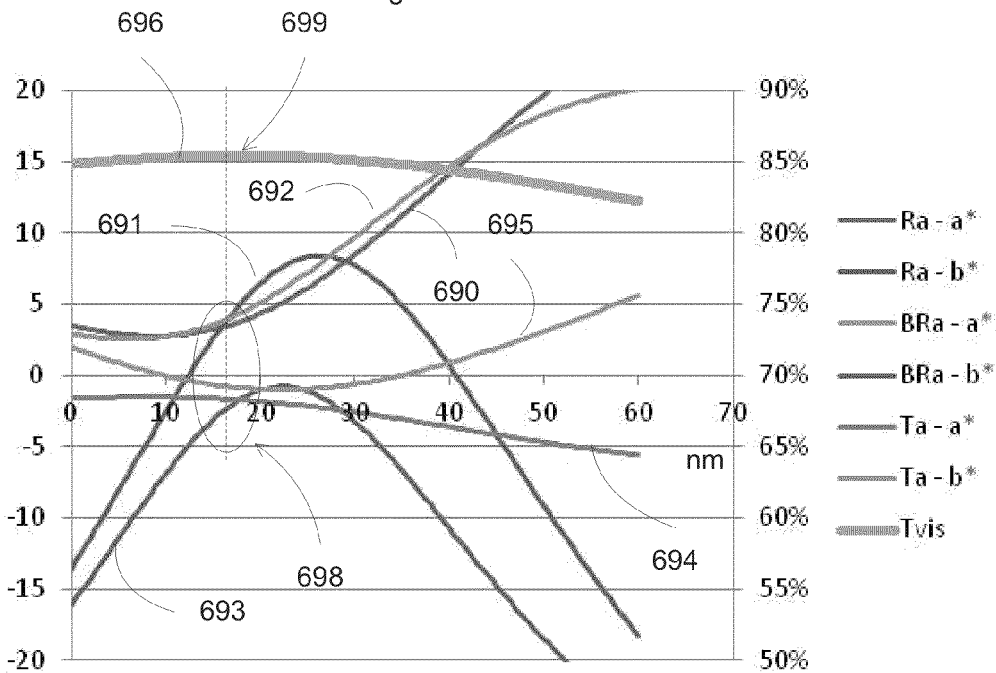

FIGS. 6A-6B illustrate the color and transmittance properties of the double layer base layer low emissivity stack as a function of the thicknesses (in nm) of individual layers in the base layer. In FIG. 6A, the color property of the stack is shown as a function of the $TiO_2$ thicknesses, including transmittance Ta—a* 684 and Ta-b* 685, of the reflection from the coated layer side Ra-a* 680 and Ra-b* 681, and of the reflection from the glass side BRa-a* 682 and BRa—b* 683. In addition, the transmittance of the visible light Tvis 686 is measured. The range 688 of optimum $TiO_2$ layer thicknesses in the base layer can be between 10 and 16 nm. To achieve color neutral, the thickness of the $TiO_2$ layer base layer can be within this range, showing an optimum transmittance 689 of the coated stack to be about 85.5%, determined from the transmittance curve 686 at the $TiO_2$ layer thickness in the base layer of about 12 nm.

In FIG. 6B, the color property of the stack is shown as a function of the BO thicknesses, including transmittance Ta-a* 694 and Ta-b* 695, of the reflection from the coated layer side Ra-a* 690 and Ra-b* 691, and of the reflection from the glass side BRa-a* 692 and BRa-b* 693. In addition, the transmittance of the visible light Tvis 696 is measured. The range 698 of optimum BO layer thicknesses in the base layer can be between 12 and 20 nm. To achieve color neutral, the thickness of the BO layer base layer can be within this range, showing an optimum transmittance 699 of the coated stack to be about 85.5%, determined from the transmittance curve 696 at the BO layer thickness in the base layer of about 17 nm.

Thus for similar color neutral property, e.g., similarly low values of L, a* and b*, the transmission of the low-e coatings using double layer base layer can be higher, 85.5% as compared to 84.7%, of the control coatings using single layer base layer.

Figure 7:
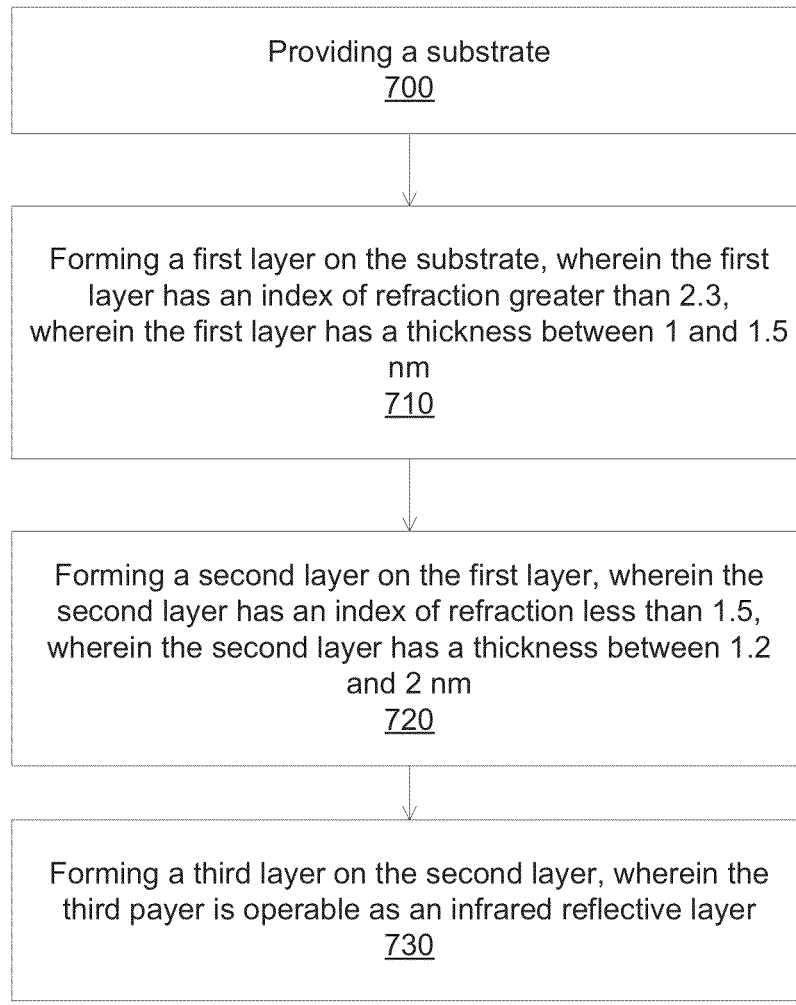
FIG. 7 illustrates a flow chart for sputtering coated layers according to some embodiments.

FIG. 7 illustrates a flow chart for sputtering coated layers according to some embodiments. In operation 700, a substrate is provided. The substrate can include a transparent substrate such as a glass substrate or any other transparent substrates, such as substrates made of organic polymers. In operation 710, a first layer is formed on the substrate. The first layer can include a layer having index of refraction greater than 2.3. The thickness of the first layer can be between 10 and 15 nm. In some embodiments, the first layer can have a thickness between 11 and 13 nm. The first layer can include $TiO_x$, $NbO_x$, or $BiO_x$, such as $TiO_2$, $Nb_2O_5$, or $Bi_2O_3$.

In operation 720, a second layer is formed on the first layer. The second layer can include a layer having index of refraction less than 1.5. The thickness of the first layer can be between 12 and 20 nm. In some embodiments, the second layer can have a thickness between 16 and 18 nm. The second layer can include $MgF_2$, $CaF_2$, or $SiO_2$, or a co-sputter oxide. In some embodiments, the second layer can include boron oxide.

In some embodiments, the second layer is formed on the first layer without being exposed to the ambient environment, e.g., ambient air.

In operation 730, a third layer is deposited on the second layer. In some embodiments, the third layer is operable as an infrared reflective layer, such as silver. In some embodiments, a seed layer, such as a zinc oxide, doped zinc oxide, tin oxide, or doped tin oxide layer, can be deposited before depositing the infrared reflective layer. Since the third layer is deposited on the seed layer, the crystal orientation of the third layer can influence the crystal orientation of the seed layer. For example, the seed layer can include zinc oxide having improved (002) crystal orientation, which can allow a silver layer having improved (111) crystal orientation, as compared to a silver layer deposited on a zinc oxide layer with less (002) crystal orientation.

In some embodiments, the third layer can be thin, for example, less than or equal to about 20 nm, or less than or equal to about 10 nm. The third layer can be formed in-situ on the second and/or first layer without exposing to ambient environment.

In some embodiments, the method can further include depositing an antireflective layer, or a barrier layer over the substrate. In some embodiments, an annealing step can be performed in an oxygen-containing ambient, for example, after forming the second layer. The annealing step can partially oxidize the first layer, forming an at least partially oxidized first layer.

In some embodiments, a photovoltaic device, a LED (light emitting diode) device, a LCD (liquid crystal display) structure, or an electrochromic layer is formed on the substrate having the layer structure.

Figure 8:
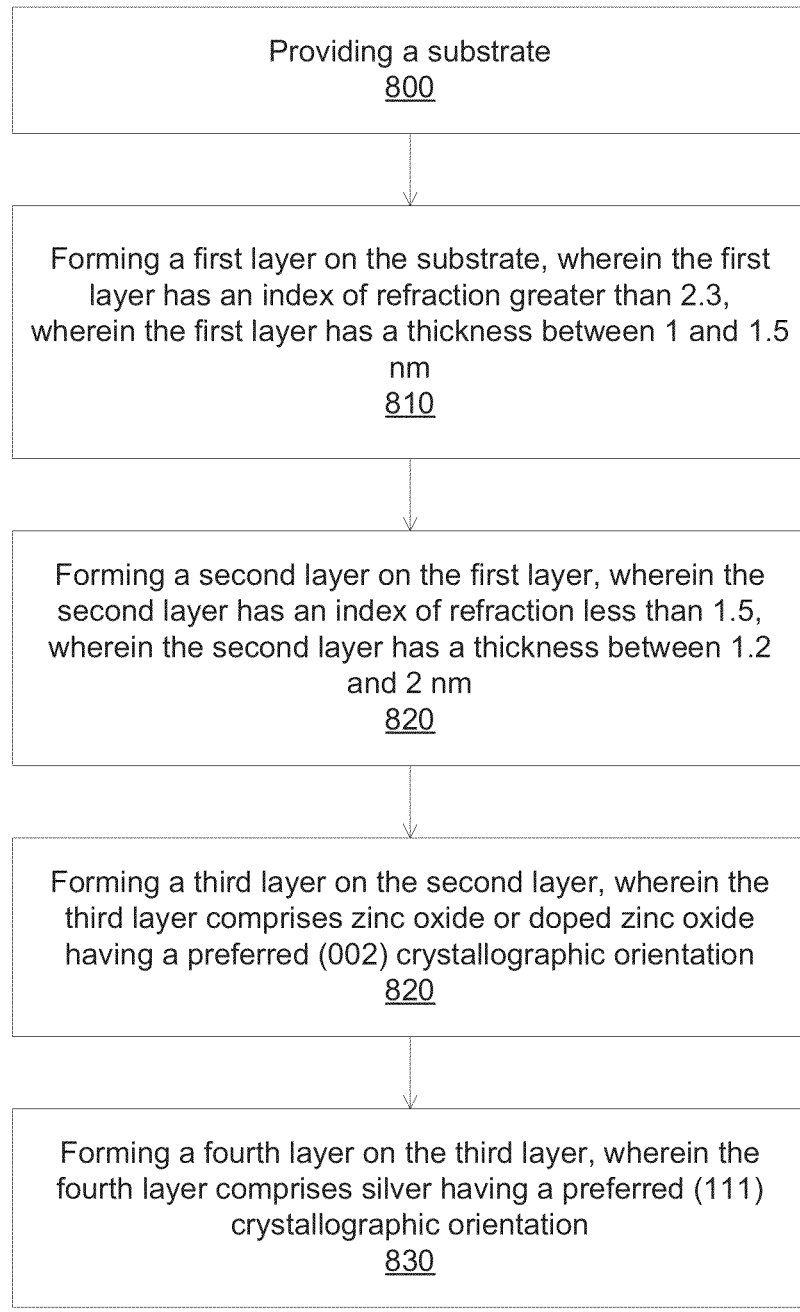
FIG. 8 illustrates a flow chart for sputtering coated layers according to some embodiments.

FIG. 8 illustrates a flow chart for sputtering coated layers according to some embodiments. In operation 800, a substrate is provided. In operation 810, a first layer is formed on the substrate. The first layer can include a layer having index of refraction greater than 2.3. The thickness of the first layer can be between 10 and 15 nm. In some embodiments, the first layer can have a thickness between 11 and 13 nm. The first layer can include $TiO_x$, $NbO_x$, or $BiO_x$, such as $TiO_2$, $Nb_2O_5$, or $Bi_2O_3$.

In operation 820, a second layer is formed on the first layer. The second layer can include a layer having index of refraction less than 1.5. The thickness of the first layer can be between 12 and 20 nm. In some embodiments, the second layer can have a thickness between 16 and 18 nm. The second layer can include $MgF_2$, $CaF_2$, or $SiO_2$, or a co-sputter oxide. In some embodiments, the second layer can include boron oxide. In some embodiments, the second layer is formed on the first layer without being exposed to the ambient environment, e.g., ambient air.

In operation 830, a third layer is formed on the second layer, wherein the third layer includes zinc oxide or doped zinc oxide with a (002) preferred crystallographic orientation. In some embodiments, the third layer is less than or equal to about 100 nm. In some embodiments, the third layer is less than or equal to about 10 nm. The third layer can be formed in-situ on the second and/or first layer without exposing to ambient environment. In operation 840, a fourth layer is formed on the third layer, wherein the fourth layer includes silver having a (111) preferred crystallographic orientation. In some embodiments, the fourth layer can be thin, for example, less than or equal to about 20 nm, or less than or equal to about 10 nm. The fourth layer can be formed in-situ on the third layer without exposing to ambient environment.

In some embodiments, the method can further include depositing an antireflective layer, or a barrier layer over the substrate. In some embodiments, an annealing step can be performed in an oxygen-containing ambient, for example, after forming the second layer. The annealing step can partially oxidize the first layer, forming an at least partially oxidized first layer.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A low emissivity panel, comprising:
    a transparent substrate;
    a first layer formed directly on the substrate,
        wherein the first layer comprises silicon-zirconium nitride;
    a second layer formed directly on the first layer,
        wherein the second layer has an index of refraction greater than 2.3,
        wherein the second layer comprises bismuth oxide,
        wherein the second layer has a thickness between 10 and 15 nm;
    a third layer formed directly on the second layer,
        wherein the third layer has an index of refraction less than 1.5,
        wherein the third layer comprises boron oxide, magnesium fluoride, calcium fluoride, silicon oxide, or a combination thereof,
        wherein the third layer has a thickness between 12 and 20 nm;
    a fourth layer formed directly on the third layer,
        wherein the fourth layer comprises zinc oxide, doped zinc oxide, tin oxide, or doped tin oxide; and
    a fifth layer formed directly on the fourth layer,
        wherein the fifth layer comprises silver, gold, or copper and is operable as an infrared reflective layer.

2. The low emissivity panel of claim 1 wherein the first layer has a thickness between 11 and 13 nm, and the second layer has a thickness between 16 and 18 nm.

3. The low emissivity panel of claim 1 wherein the fourth layer comprises zinc oxide.

4. The low emissivity panel of claim 1 further comprising
    a barrier layer formed directly on the fifth layer, wherein the barrier layer comprises nickel, titanium, chromium, or a combination thereof.

5. A low emissivity panel, comprising:
    a transparent substrate, wherein the transparent substrate comprises glass;
    a first layer formed directly on the substrate,
        wherein the first layer comprises silicon-zirconium nitride;
    a second layer formed directly on the first layer,
        wherein the second layer has an index of refraction greater than 2.3,
        wherein the second layer comprises titanium oxide, niobium oxide, or bismuth oxide,
        wherein the second layer has a thickness between 10 and 15 nm;
    a third layer formed directly on the second layer,
        wherein the third layer has an index of refraction less than 1.5,
        wherein the third layer comprises calcium fluoride,
        wherein third layer has a thickness between 12 and 20 nm;
    a fourth layer formed directly on the third layer,
        wherein the fourth layer comprises zinc oxide, doped zinc oxide, tin oxide, or doped tin oxide; and
    a fifth layer formed directly on the fourth layer,
        wherein the fifth layer comprises silver, gold, or copper and is operable as an infrared reflective layer.

6. The low emissivity panel of claim 5 wherein the fourth layer has a thickness of 10 nm.

7. The low emissivity panel of claim 5 wherein the second layer comprises bismuth oxide.

8. The low emissivity panel of claim 5 wherein the fourth layer comprises silver.

* * * * *